UNITED STATES PATENT OFFICE 2,099,363

TEXTILE

Winfield W. Heckert, Arden, Del., assignor to E. I. du Pont de Nemours & Company, Wilmington, Del., a corporation of Delaware No Drawing. Application August 3, 1936, Serial No. 94,116

12 Claims. (Cl. 91—70)

This invention relates to the finishing of textiles and particularly to finishes therefor, which are based on amino-nitrogen containing polymeric substances, such as deacetylated chitin.

Water repellent textiles have been prepared heretofore by the application thereto of wax emulsions. However, such water repellent effects are readily removed by prolonged scouring with soap or by dry cleaning with an organic solvent containing a dry cleaning soap comprising, for example, potassium oleate and oleic acid. Water repellent finishes have also been prepared by superficially esterifying the surface of a cellulosic textile material, but these water repellent effects can be removed by scouring in the presence of alkali and soap, which saponify off the combined fatty acids. Solutions of deacetylated chitin in acetic acid, among them solutions having waxes emulsified therein, have been used as sizing materials for textiles. Such sizes, however, are more or less readily removed by scouring with warm acetic acid.

This invention has as an object the preparation of water repellent finishes for textiles and other materials. A further object is the development on textiles of a finish which is stable against the action of water, soap, acids, alkalies, dry cleaning solvents and scouring and cleaning conditions in general. A further object is the production of permanent stiffening and delustering effects on textile materials. A further object is the preparation of coatings comprising the derivatives of deacetylated chitin with the higher fatty acids.

These objects are accomplished by the following invention wherein the anhydride of a higher fatty acid such as stearic acid is emulsified in a solution of a salt of an amino-nitrogen containing polymer such as deacetylated chitin and the emulsion applied to the article which is to be coated or finished, the water being then evaporated and the object heated above the melting point of the acid anhydride for a sufficient period of time to cause the anhydride to react with the deacetylated chitin.

In George W. Rigby, U. S. Patent No. 2,040,879, methods are disclosed for the preparation of grades of deacetylated chitin suited for use in this invention. The methods given by Rigby show that deacetylated chitin of predetermined viscosity can be obtained by proper integration of time, temperature, and concentration of alkali in the deacetylation step. In the process of the present invention, I may employ deactylated chitin having viscosities of from 1 to 3000 poises, this being the viscosity at 25° C. of a 5% solution in 5% aqueous acetic acid.

The deacetylated chitin solution referred to in the examples given hereinafter was prepared by tumbling for 16 hours and subsequently filtering through cheesecloth a mixture of 40 parts of deacetylated chitin having a viscosity of 14 poises, 20 parts of glacial acetic acid, and 1940 parts of water. This solution and other solutions of deacetylated chitin in aqueous acetic acid are correctly referred to as aqueous solutions of deacetylated chitin acetate.

The following examples illustrate satisfactory methods of carrying out the invention.

Example I

One hundred grams of deacetylated chitin solution is placed in a small colloid mill set up in such a manner that the solution recirculates from the outlet back into the mill. The motor is allowed to run until the temperature of the solution rises to about 65° C. At this point, 60 g. of molten stearic anhydride at a temperature between 70 and 75° C. is poured into the mill in a fine stream. The emulsion is recirculated through the mill until the temperature rises to 70° C. at which point it is discharged onto approximately 200 g. of ice. The emulsion is diluted to 500 g. with water. Only a comparatively small proportion of the stearic anhydride hydrolyzes during this emulsification procedure. Viscose rayon hose are impregnated with this emulsion. The excess emulsion is pressed out of the hose, after which they are dried at room temperature. They are then placed in an oven for three and a half minutes at 150° C. The stearic anhydride melts and reacts with the amine groups of the deacetylated chitin, and perhaps to a lesser extent with the hydroxyl groups. The hose are finally scoured with soap to remove the stearic acid and excess stearic anhydride. These hose have about the same degree of water repellence as hose treated with an emulsion of wax in deacetylated chitin solution. However, on treating both with solvent naphtha containing a dry cleaning soap comprising potassium oleate and oleic acid, the water repellent properties of the wax emulsion treated hose are completely removed, whereas those of the stearic anhydride emulsion treated hose are substantially unimpaired. Similar improvements are obtained with dress fabrics, which are more generally subjected to dry cleaning.

When stiffening and delustering effects are desired in addition to the water repellent effect, a higher concentration of deacetylated chitin is used in the stearic anhydride emulsion. This is illustrated in the following example.

Example II

An emulsion is prepared by recirculating 90 parts of the deacetylated chitin solution described above in a "Disper" colloid mill until it reaches a temperature of 72° C., 10 parts of solid stearic anhydride then being added thereto. After all of the stearic anhydride melts and becomes emulsified, the emulsion is run into a vessel and cooled in cold water. Viscose rayon yarn is impregnated with this emulsion. The excess emulsion is squeezed out and the yarn is dried at room temperature, after which it is heated for three minutes at 150° C. to bring about reaction between the deacetylated chitin and the stearic anhydride. After washing to remove excess stearic acid and stearic anhydride, the treated rayon is highly water repellent and thoroughly delustered. It is materially stiffened by the treatment but has a softer and more soap-like feel than rayon which has been treated with deacetylated chitin solutions alone and then baked and washed in a similar manner. Where both are subjected to prolonged scouring with 0.5% trisodium phosphate at 70° C., the size is retained well on both products, but that treated with the stearic anhydride-deacetylated chitin emulsion is considerably bleached and acquires a very pleasant somewhat linen-like feel. On the other hand, where both are scoured with 2% acetic acid at 70° C. the acid completely removes the deacetylated chitin size whereas the stearic anhydride-deacetylated chitin size is completely stable against this reagent. Delustering obtained in the manner described in this example appears to be surface delustering. It does not interfere materially with the affinity of the rayon for a direct dyestuff and, furthermore, the dyed skein is very thoroughly delustered in spite of its dark shade. This effect is of practical importance because rayon delustered by the incorporation of delustering agents within the filament generally regains a considerable proportion of its luster when dyed to a deep shade.

Example III

One hundred fifty grams of the deacetylated chitin solution described above and 277 g. of water are recirculated in a colloid mill until the temperature reaches about 65° C. At this point, 133 g. of molten stearic anhydride is poured into the mill. After several minutes the emulsion is run out onto ice and diluted to 1000 g. It consists of an emulsion of stearic anhydride particles of 2–6 microns in a deacetylated chitin acetate solution. Forty-two grams of glycerin are added. Regenerated cellulose films are coated with this emulsion by impregnation with the emulsion and then scraping with a doctor knife to a depth of film of about 0.007". The film is dried at room temperature under tension and then heated for about three minutes at 150° C. It is then coated with the usual pyroxylin type moistureproofing lacquer. On testing the resulting film in dilute acetic acid, the lacquer shows improved adhesion to the film as compared with lacquers anchored with deacetylated chitin. These films are slightly cloudy due to the delustering effect of the emulsion and consequently this treatment is of most value in treating opaque regenerated cellulose film.

Example IV

An aqueous emulsion containing 1.1% stearic anhydride and 0.4% deacetylated chitin as the acetate is applied to a sheet of 40 lb. ream weight paper (made from bleached sulfite cellulose and formed on a paper machine without calendering), the amount of the emulsion used being equal in weight to the weight of the paper. The treated paper is dried at a low temperature and finally heated to 120° C. for 20 minutes or to 150° C. for 3 minutes. The paper is then calendered. It is rendered water repellent and improved in strength by the treatment.

The invention is not limited to the use of deacetylated chitin of 14 poise viscosity. It may, for example, be of the low, medium, or high viscosity type, which three grades have been arbitrarily set at 1–35, 35–250, and above 250 poises, respectively, (i. e. of the 5% solution in 5% acetic acid).

For use in the present invention, the deacetylated chitin may be dissolved in any of the water-soluble acids disclosed in U. S. Patent No. 2,040,879, such typical acids being acetic, hydrochloric, formic, lactic, pyruvic, tartaric, malic, chloroacetic, and the like. Volatile, water-soluble organic acids such as formic and acetic are preferred.

The ratio of stearic anhydride to deacetylated chitin may be varied within relatively wide limits during emulsion preparation but it is essential in order to obtain a free flowing emulsion to have present at least about 2% deacetylated chitin on the basis of the stearic anhydride, or to use a suitable emulsion assistant such as those described in McQueen and Merrill, U. S. Patent 2,047,217. Emulsions containing high ratios of deacetylated chitin to stearic anhydride can be prepared by emulsifying small proportions of stearic anhydride in 5% solutions of deacetylated chitin.

On a theoretical basis each part of deacetylated chitin requires 3.41 parts of stearic anhydride in order to convert it to the stearic amide. If smaller ratios are used, then a smaller proportion of the amino groups will be converted to the amide form. If larger ratios of stearic anhydride are employed then there is a possibility of obtaining some esterification of the hydroxyl groups present in the deacetylated chitin. Since up to about 20% of the anhydride may be hydrolyzed during the emulsification procedure, it is generally preferred to use between four and five parts of stearic anhydride to each part of deacetylated chitin in the impregnating bath.

If it is desired to produce a finish with water repellent properties but with little or no delustering and stiffening effect, then the concentration of deacetylated chitin should be about 0.4% or less in the impregnating solution. On the other hand, if it is desired to obtain highly delustered and highly stiffened products, the concentration of the deacetylated chitin in the impregnating or coating solution can be raised to 2–5%.

It is preferred to conduct the drying of the impregnated or coated material at a low temperature so that further hydrolysis of the acid anhydride by water vapor is avoided.

The heating step (distinct from and subsequent to the drying step just mentioned) may be carried out at any temperature above that of the melting point of the stearic or other anhydride (72° C. in the case of stearic). The higher the temperature, the less time is required to bring about the desired reaction of the acid anhydride with the deacetylated chitin. In order to complete the reaction in a few minutes, it is preferred to carry out the baking at a temperature of 120–150° C. If it is satisfactory to use long periods of the order of a number of hours, then it is possible to use temperatures between about 80° C. and 100° C. Oven treatment is not necessary. Ironing for a similar period of time with a hot iron at the required temperature will produce similar effects.

Excess stearic acid or anhydride can be removed by scouring with soap, dilute sodium carbonate, sodium phosphate solutions, or organic solvents.

It is possible to include pigments in the deacetylated chitin anhydride emulsion and thus obtain a still greater delustering effect. Waxes and other water repellents can also be added to the emulsion, but it appears that the use of very much of these materials tends to reduce the activity of the anhydride. Furthermore, waxes seem to be rather easily removed during the scouring operation, perhaps because they have melted and become admixed with a considerable proportion of stearic acid or other fatty acid which readily emulsifies them in the scouring solution.

While the invention has been described in terms of stearic anhydride with which outstanding results are obtained, in general other anhydrides which are insoluble in water and substantially non-reactive toward water at their melting point may be used. The anhydrides of fatty acids of at least ten carbon atoms, including capric, lauric, myristic, palmitic, oleic, erucic, di-n-octyl acetic, arachidic and cerotic acids, for example, are especially suitable. They are so insoluble in water that they can be readily emulsified without appreciable decomposition. For similar reasons they do not react with the deacetylated chitin in the presence of water. However, after the emulsion has been applied to a fabric or other article and the latter thoroughly dried and heated above the melting point of the anhydride, a reaction occurs between the deacetylated chitin and the acid anhydride to yield the acyl derivative of the deacetylated chitin. The reaction probably takes place in preference to esterification by the anhydride of any hydroxyl groups which may be present in the fabric or other article being treated, this being due to the fact that amide formation is generally more rapid than esterification. It is possible, of course, that a small amount of the anhydride will be diverted to ester formation, but probably it will not be appreciable unless a fairly large amount is used, and/or until substantially all the amino groups of the deacetylated chitin have reacted. The final product, which may be considered to comprise an amide or mixed ester-amide, and is in any case distinguished by a coating of an acyl derivative of deacetylated chitin is highly water-repellent and somewhat softer to touch than a film of deacetylated chitin alone. It is not attacked by dilute acids, dilute alkalies, or dry cleaning soaps and solvents.

The invention has been illustrated with and discussed in terms of deacetylated chitin. However, it is possible to employ instead any primary or secondary amino-nitrogen containing polymeric substance which is insoluble in water and in 5% aqueous ammonia, soluble in at least the stoichiometrical amount of 2% aqueous acetic acid, and capable of being formed into coherent films therefrom. Other types of amino polymers which may be used in the practice of the invention are the resins obtained by reacting diphenylguanidine, formaldehyde, and methylamine; the monoalkylamino celluloses such as n-amylamino (methyl) cellulose, whose preparation is described in Haskins, Serial No. 61,806, filed January 31, 1936; the aminoalkyl celluloses, such as aminoethyl cellulose, which are disclosed in Hardy, Serial No. 61,842, filed January 31, 1936; and the resins obtained by reacting vinyl ketone polymers with ammonia (such as the reaction product of ammonia and methyl vinyl ketone polymer) which are described in Balthis, Serial No. 69,725, filed March 19, 1936.

Since the water repellent and delustering effects described in this invention arise from a reaction between the deacetylated chitin and the anhydride, the process is not limited to application to cellulosic films, filaments and textiles, or other esterifiable products. In general, the anhydride-deacetylated chitin emulsion may be applied to cotton, regenerated cellulose, and cellulose derivative (e. g. cellulose acetate), threads and textiles, and to paper, wool, felt, linen, or any other object or surface to which it is desired to impart substantially permanent waterproofing effects. It is only necessary that this object or surface be capable of withstanding the temperature used in the process.

The outstanding advantage of this invention is that it enables the preparation of a water repellent finish which is stable both to prolonged alkaline scouring which would saponify off an ester coating and to prolonged scouring in acid solution or with dry cleaning solvents and soaps. It enables the preparation of supple yet stiffening finishes which have a very pleasant feel in comparison with the relatively harsh feel of fabric coated with deacetylated chitin itself. It provides a surface delustering of fabric in such a manner that the luster does not return on dyeing to a deep shade. In this respect it is superior to the precipitation of barium sulfate or other insoluble compounds in the fiber, or to the application of pigments by means of deacetylated chitin or positively charged dispersing agents in that prolonged washing does not remove the delustering agent. One sample was scoured for a whole week at 70° C. in 0.5% trisodium phosphate without losing its dull appearance. The delustering seems to be caused by the formation of an irregular film of the higher fatty acid derivative of deacetylated chitin on the surface of the thread. This film is irremovable with any of the usual washing agents and thus the delustering effect is entirely stable. Surprisingly, this film does not prevent dyeing with direct dyestuffs. Since it is on the outside of the fiber it is not obscured by the dye and exerts its delustering effect after dyeing as well as before.

The above description and examples are intended to be illustrative only. Any modification of or variation therefrom which conforms to the spirit of the invention is intended to be included within the scope of the claims.

I claim:

1. Process of finishing rayon which comprises impregnating rayon yarn with an emulsion of 10 parts of stearic anhydride in 90 parts of a 2% solution of deacetylated chitin in dilute aqueous acetic acid, drying, and heating for three minutes at 105° C.

2. Process of finishing textile materials which comprises impregnating them with an emulsion of stearic anhydride in an aqueous acetic acid solution of deacetylated chitin, drying, and heating above 72° C.

3. Process of finishing textile materials which comprises impregnating them with an emulsion of stearic anhydride in an aqueous acetic acid solution of deacetylated chitin, drying and heating at 100 to 150° C. for three minutes to four hours, the longer periods of time being used with the lower temperatures.

4. Process of finishing textile materials which comprises impregnating them with an emulsion of stearic anhydride in an aqueous acetic acid solution of deacetylated chitin, drying, and heating to effect combination of the anhydride and deacetylated chitin.

5. Process of finishing textile materials which comprises treating a textile material with an emulsion of the anhydride of a fatty acid of at least ten carbon atoms in an aqueous solution of a salt of deacetylated chitin with a volatile organic acid, drying the textile material, and heating the same above the melting point of the material to effect combination between the anyhdride and the deacetylated chitin.

6. Process of coating objects which comprises applying to the same an emulsion of the anhydride of a fatty acid of at least ten carbon atoms in an aqueous solution of a salt of deacetylated chitin with a volatile organic acid, drying the textile material and heating the same above the melting point of the material to effect combination between the anhydride and the deacetylated chitin.

7. A coating composition comprising an emulsion of a water-insoluble acid anhydride of a fatty acid of at least 10 carbon atoms in a solution of deacetylated chitin in a dilute aqueous volatile acid, said anhydride being one which at its melting point is stable toward water.

8. An object coated with a combination product of deacetylated chitin with a water-insoluble anhydride stable at its melting point to water, said anhydride being the anhydride of a fatty acid of at least 10 carbon atoms.

9. A textile material having a coating thereon of a combination product of deactylated chitin with a water-insoluble monocarboxylic acid anhydride stable at its melting point toward water.

10. A textile material having a coating thereon of a combination product of deacetylated chitin with an anhydride of a fatty acid having at least ten carbon atoms.

11. A textile material having a coating thereon of a deacetylated chitin-stearic anhydride combination product.

12. A delustered, water-repellent, permanently stiffened textile coated with 1–10% of a combination product of deacetylated chitin with the anhydride of a fatty acid of at least ten carbon atoms.

WINFIELD W. HECKERT.